United States Patent
Ko et al.

(10) Patent No.: US 7,260,111 B2
(45) Date of Patent: Aug. 21, 2007

(54) MAP MESSAGE PROCESSING SYSTEM AND METHOD FOR INTERWORKING BETWEEN HETEROGENEOUS NETWORKS

(75) Inventors: Hong-Gi Ko, Kyungki-Do (KR); Chun-Su Park, Seoul (KR)

(73) Assignee: LG Electronics Inc., Seoul (KR)

( * ) Notice: Subject to any disclaimer, the term of this patent is extended or adjusted under 35 U.S.C. 154(b) by 1087 days.

(21) Appl. No.: 10/139,287

(22) Filed: May 7, 2002

(65) Prior Publication Data

US 2002/0183060 A1    Dec. 5, 2002

(30) Foreign Application Priority Data

May 7, 2001    (KR) ................ 2001-24610

(51) Int. Cl.
*H04J 3/22* (2006.01)
*H04Q 7/20* (2006.01)

(52) U.S. Cl. .............. 370/467; 370/401; 370/469; 455/432

(58) Field of Classification Search ........ 370/464–467, 370/469, 474, 401; 455/432, 435, 560
See application file for complete search history.

(56) References Cited

U.S. PATENT DOCUMENTS

| | | | | |
|---|---|---|---|---|
| 5,991,619 A | * | 11/1999 | Choi .................... | 455/432.2 |
| H1895 H | * | 10/2000 | Hoffpauir et al. .......... | 455/433 |
| 6,577,723 B1 | * | 6/2003 | Mooney ............... | 379/221.08 |
| 7,006,433 B1 | * | 2/2006 | Dantu et al. ............ | 370/218 |
| 2002/0173320 A1 | * | 11/2002 | Aitken et al. ........... | 455/466 |
| 2004/0190501 A1 | * | 9/2004 | Park et al. ............. | 370/352 |

FOREIGN PATENT DOCUMENTS

| | | |
|---|---|---|
| CN | 1266594 A | 9/2000 |
| WO | WO99/08457 | 2/1999 |

* cited by examiner

*Primary Examiner*—Chi Pham
*Assistant Examiner*—Saba Tsegaye
(74) *Attorney, Agent, or Firm*—KED & Associates, LLP

(57) ABSTRACT

A MAP message processing system for interworking between heterogeneous networks includes a protocol identifying unit which analyzes a TCAP message to identify a protocol type of a message originating network which transmitted a MAP message associated with the TCAP message; and a protocol distributing unit which distributes the MAP message to a corresponding MAP layer based on the protocol type identified by the protocol identifying unit. Identification of the protocol type of the message originating network may be accomplished by determining whether the TCAP message contains specific type of information. This information includes any one or more of a specific type of dialogue portion in the TCAP message, a specific type of operation code, and a certain MAP start tag value. The absence of this information may also provide an indication of the protocol type of the originating network. The system is especially well suited to providing interworking between ANSI-based and GSM-based mobile networks, although other types of networks are contemplated. The system and an associated method is particularly useful in providing global roaming services.

36 Claims, 4 Drawing Sheets

MAP MESSAGE PROCESSING SYSTEM AND METHOD FOR INTERWORKING BETWEEN HETEROGENEOUS NETWORKS

BACKGROUND OF THE INVENTION

1. Field of the Invention

The present invention relates to providing communications between networks, and more particularly to a mobile application part (MAP) message processing system and method for interworking between heterogeneous networks which adhere to different communications protocols.

2. Background of the Related Art

A next-generation mobile communication service has been proposed to provide extended multimedia service by integrating a voice-oriented, first-generation analog mobile phone and a voice and low-speed data transmission-available second-generation digital mobile phone.

A representative example is an IMT-2000 service which provides a multimedia communication service such as the Internet and an image transmission through a system combining a wired network, a wireless network and a satellite network. The IMT-2000 service also provides a global roaming service that allows a user to use a mobile communication service with one terminal even though the user moves to anywhere in the world on the basis of using the common frequency and a single technology standard.

In order to provide such a global roaming service, the whole world should use the same technical method and a frequency of the same band. However, as for the current technology method of the next-generation mobile communication service, like the initial intention of an international standard organization that was willing to make a single technology standard, an asynchronous method has been adopted as a standard in Europe, while a multicarrier technology and ANSI-MAP has been adopted as a standard in the North America.

The GSM-MAP is based on the standard of a global system for mobile communication (GSM) 09.02 or 29.002 on a European telecommunication standards Institute (ETSI)/$3^{rd}$ generation partnership project (3GPP), while the ANSI-MAP is based on the interim standard-41 (IS-41) standard of the American National Standards Institute (ANSI)/3GPP2.

Accordingly, in order to implement a global roaming service for a next-generation mobile communication service in such an environment, a network interworking technology is required between the ANSI-MAP-based core network (referred to as 'ANSI' network, hereinafter) and GSM-MAP-based core network (referred to as 'GSM' network, hereinafter).

FIG. 1 is a drawing illustrating a MAP message flow in the ANSI network in accordance with a conventional art, and FIG. 2 is drawing illustrating a MAP message flow in the GSM network in accordance with a conventional art. The ANSI network of the GSM network transmits and processes a MAP message in order to manage a location of a mobile station, process a mobile call, and provide various supplementary services related to a call processing. MAP messages are defined by a remote operation, and are transmitted between network elements using a service provided by lower layer protocols.

The lowest tree levels of the SS7 architecture, referred to as the message transfer part (MTP), provide a reliable but connectionless (datagram style) service for routing messages through the SS7 network. MTP level 1 (MTP1) allows the use of any digital-type interface. MTP level 2 (MTP2) provides the functions necessary for basic error detection and correction. This protocol is concerned only with the reliable delivery of signal units between two exchanges or SPs. There is no consideration outside of the signaling link and it has no knowledge of the final destination. The MTP level 3 (MTP 3) protocol has the responsibility of transporting messages between SPs. There are two broad functional categories preformed by this layer network management and message handling.

MTP does not provide the complete set of functions and services specified in the OSI layer 1-3, most notably in the areas of addressing and connection-oriented service. In the 1984 version of SS7, an additional module was added, which resides in level four of SS7 and which is known as the signaling connection control part SCCP).

One major enhancement provided by the SCCP is its expanded addressing functionality. The SCCP supplements MTP addressing by defining an additional field called the subsystem number (SSN), which consists of local addressing information used to identify SCCP users at each node. The combination of OPC plus SSN forms the calling party address, and the DPC plus SSN number is the called party address.

Another SCCP enhancement is its ability to use global titles as addresses. A global title is a special address, such as an 800 number, that does not provide information usable for routing. SCCP is the protocol that performs the global title translation.

The transaction capabilities application part (TCAP), first introduced in 1988, provides the mechanisms for transaction-oriented (as opposed to connection-oriented) applications and functions. TCAP provides a general purpose, remote operation function for SS7. It provides the capability for an application at one node to invoke the execution of an operation at another node and to receive the results from that remote process. TCAP was originally designed to support queries into databases, although its role can include additional functions.

TCAP comprises two protocol sublayers called the transaction sublayer (TSL) and the component sublayer (CSL). The TSL is the lower TCAP sublayer and it defines how the transaction or dialogue will take place, that is, what will be the context in which the remote operation will take place. There are two types of dialogues: the unstructured dialogue, that is a one-way communication in which the remote peer processes our message but does not send any response back; and the structured dialogue, which is analogous to a virtual connection where queries produce responses.

The CSL is the upper TCAP sublayer which comprises two handlers called dialogue handling block (DHA) and component handling block (CHA). The CHA handles a message's called component portion and DHA handles a message's called dialogue portion as the actual messages that are contained in the TSL messages.

There are four types of CSL dialogue portions: AARQ (dialogue request), AARE, (dialogue response), ABRT (dialogue abort), AUDT (dialogue UNI). The dialogue portion allows TC-users to exchange user information outside components. The protocol associated with these exchanges is fully in charge of the TC-user and is identified by the application context name parameter. User data which is a part of dialogue portion can also be exchanged using the user information parameter.

There are four types of CSL component portions: invoke (to request a remote operation), return result (containing the response of the requested operation), return error (indicating some kind of error), and reject (indicating some kind of syntax error). Invoke and return have single and multiple message versions (in case a unique message is not enough).

The TCAP services are provided to an upper user application which is called the application service element (ASE), responsible for providing the information that a specific application needs.

A network element in the conventional next-generation mobile communication network is constructed only with the MAP of an environment that is based on one of the ANSI-MAP standard or the GSM-MAP standard Therefore, the conventional next-generation mobile communication network can process only MAP messages which conform to the same standard. Further, the conventional network fails to perfectly implement the global roaming service, which is the target of the next-generation mobile communication service. That is, the conventional next-generation mobile communication network can implement the global roaming service only if the messages they receive conform to a compatible standard specification.

SUMMARY OF THE INVENTION

An object of the invention is to solve at least the above problems and/or disadvantages and to provide at least the advantages described hereinafter.

Accordingly, an object of the present invention is to provide a MAP message processing system and method for interworking between heterogeneous networks that is capable of performing services, such as location management, mobile call processing, and providing various supplementary services, by identifying and distributing MAP messages so that heterogeneous mobile networks such as, for example, the ANSI network and GSM network can interwork with each other.

Another object of the present invention is to provide a MAP message processing system and method for interworking between heterogeneous networks that is capable of providing a global roaming service even to a different type mobile communication network subscriber.

To achieve at least the above objects, in whole or part, the present invention provides a MAP message processing system for interworking between heterogeneous networks wherein the protocol type of the message originating network is identified through a TCAP or MAP message and a message is distributed to a corresponding MAP layer in the system.

The present invention further provides a MAP message processing system for interworking between heterogeneous networks, including a protocol identifying means for analyzing a TCAP or MAP message and identifying the protocol type of message originating network; and a protocol distributing means for distributing a MAP message to a corresponding upper MAP layer according to the protocol identification information.

The present invention is also a MAP message processing system for interworking between heterogeneous networks comprising: a protocol identifying means for determining a protocol type of message originating network by identifying a dialogue portion, an operation code and a MAP start tag value of a message transmitted from lower layer to TCAP; a MAP protocol information database constructed as a database by collecting information on the MAP of the system; and a message distributing means for searching a MAP protocol information database and distributing a message to a corresponding MAP layer.

The present invention is also a MAP message processing method for interworking between heterogeneous networks using different MAP standards, wherein a protocol type of message originating network is identified through a MAP or TCAP message and a message is distributed to a corresponding MAP layer, when an ANSI-MAP based network and a GSM-MAP based network interwork.

The present invention is also a MAP message processing method for interworking between heterogeneous networks, comprising the steps of transmitting a message received from a remote node from a lower layer to TCAP; processing the received message according to its message type and identifying a protocol type of message originating network through a message analysis; and searching MAP protocol information on the basis of the originating network protocol identification information and distributing the message to a corresponding MAP layer.

The present invention is also a MAP message processing method for interworking between heterogeneous networks, comprising the steps of: transmitting a message received from a remote node from a lower layer to TCAP; processing the message received by the TCAP according to its message type; analyzing a dialogue portion of TCAP message or an operation code, and the MAP start tag value of the processed message to identify its protocol type of message originating network; and searching MAP protocol information on the originating network protocol identification information and distributing the message to a pertinent MAP layer.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

A MAP message processing system and method for interworking between heterogeneous networks will now be described with reference to the accompanying drawings.

Figure 1:
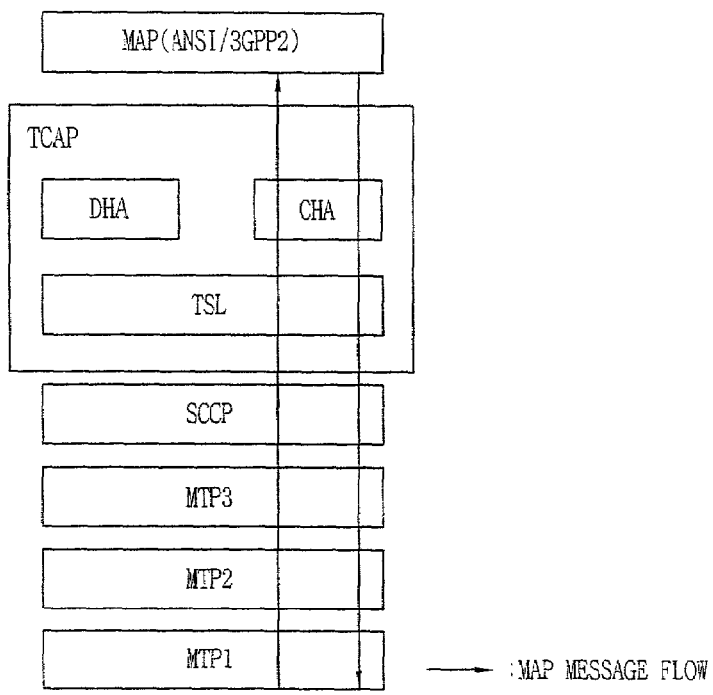
FIG. 1 is a schematic block diagram illustrating a MAP message flow in an ANSI network in accordance with a conventional art.
Figure 2:
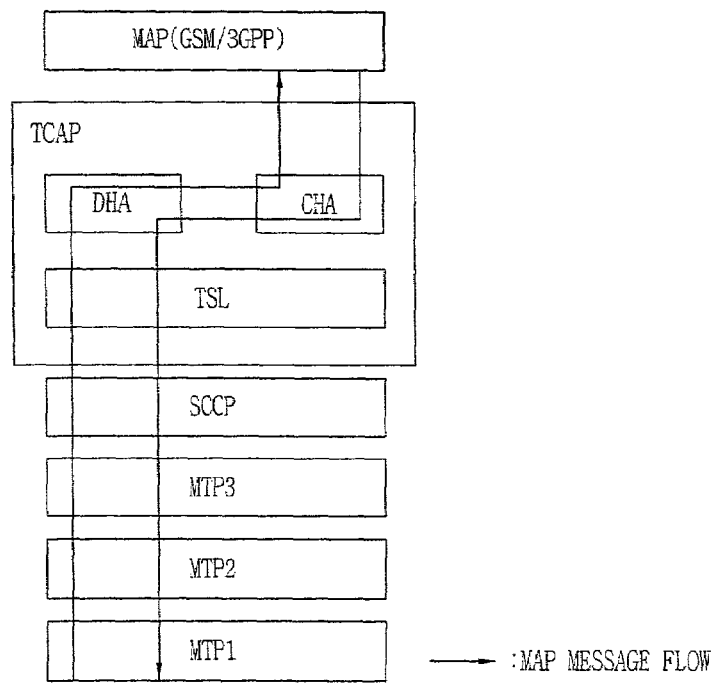
FIG. 2 is a schematic block diagram illustrating a MAP message flow in a GSM network in accordance with the conventional art.
Figure 3:
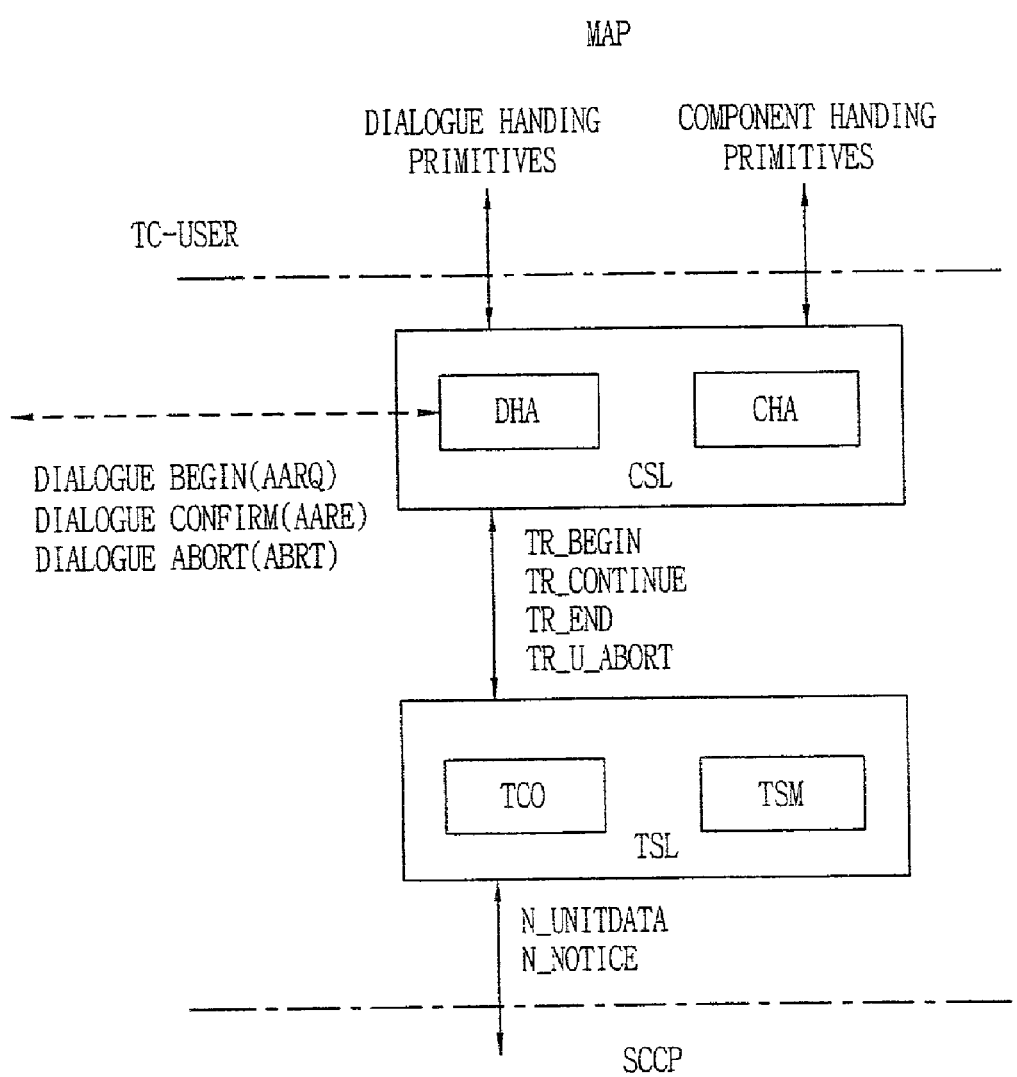
FIG. 3 is a schematic block diagram illustrating a data processing structure of a TCAP in accordance with the convention art.
Figure 4:
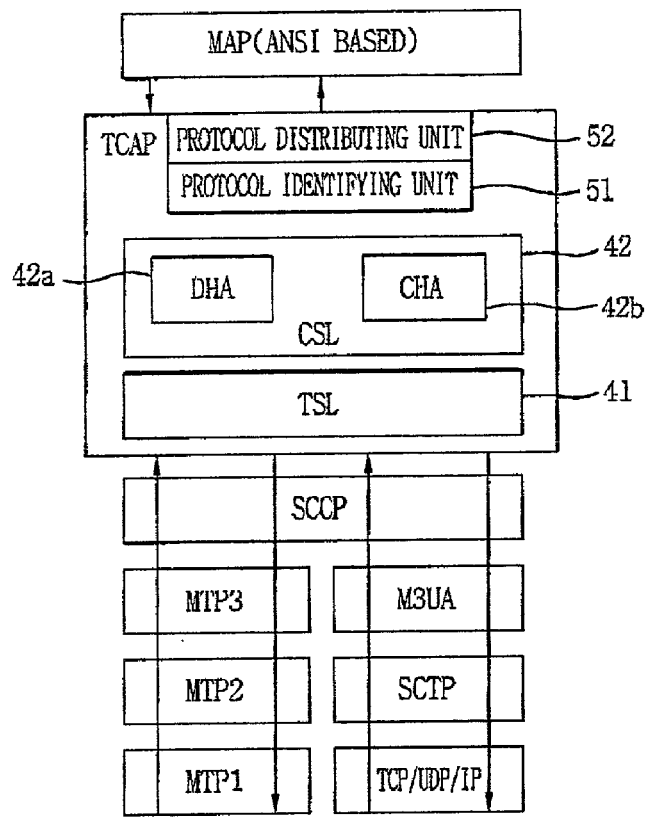
FIG. 4 is a schematic block diagram illustrating a MAP message processing structure for a different type network interworking in accordance with a preferred embodiment of the present invention.

FIG. 4 is a schematic block diagram illustrating a MAP message processing structure for heterogeneous network interworking in accordance with a preferred embodiment of the present invention, in which an ANSI network and a GSM network interwork to provide a global roaming service. While an ANSI network and a GSM network are discussed in this embodiment, those skilled in the art can appreciate that the invention may be applied to provide interworking between networks which adhere to other standards.

As shown in FIG. 4, a protocol identifying unit 51 and a protocol distributing unit 52 for identifying, distributing and processing a MAP message are included at an interface part between a TCAP protocol and a MAP protocol.

The lower level of the SCCP includes a M3UA, SCTP and TCP/UDP (user datagram protocol)/IP, which are protocols promoted for adoption to the later third-generation mobile communication network. The present invention can adopt them irrespective of a protocol form of a lower level including the SCCP.

Figure 5:
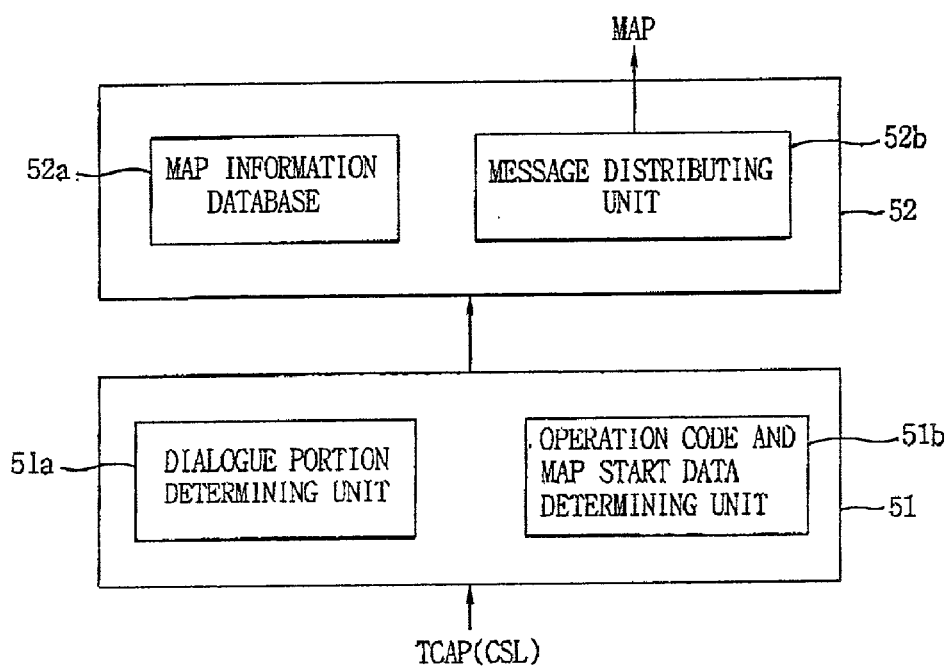
FIG. 5 is a schematic block diagram illustrating a MAP message processing system for a different type network interworking in accordance with a preferred embodiment of the present invention.

FIG. 5 is a drawing illustrating the protocol identifying unit 51 and the protocol distributing unit 52.

The protocol identifying unit 51 includes a dialogue portion determining unit 51a and an operation code and MAP start data determining unit 51b, so that it can analyze a TCAP message which has been processed by a DHA 42a and CHA 42b of the CSL 42 of the TCAP to identify a corresponding protocol type of message originating network (the ANSI network or the GSM network).

Three methods for analyzing the corresponding TCAP message to identify the originating network will now be described with reference to the TCAP message format as illustrated in Table 1.

TABLE 1

| GSM | ANSI |
| --- | --- |
| Message Type Tag | Message Type Tag |
| Total Message Length | Total Message Length |
| Originating Transaction ID Tag | Originating Transaction ID Tag |
| Transaction ID Length | Transaction ID Length |
| Transaction ID | Transaction ID |
| Dialogue Portion | Don't Care |
| Component Portion Tag | Component Portion Tag |
| Component Portion Length | Component Portion Length |
| Component Type Tag | Component Type Tag |
| Component Length | Component Length |
| Invoke ID Tag | Invoke ID Tag |
| Invoke ID Length | Invoke ID Length |
| Invoke ID | Invoke ID |
| Linked ID Tag | Linked ID Tag |
| Linked ID Length | Linked ID Length |
| Linked ID | Linked ID |
| Operation Code Tag | Operation Code Tag |
| Operation Code Length | Operation Code Length |
| Operation Code XX | Operation Code 09XX |
| Parameter Tag XX | Parameter Tag 31 |
| Parameter Length | Parameter Length |
| Parameter | Parameter |

The first method is a dialogue portion identifying method which identifies a protocol type of message originating network based on whether a dialogue portion is contained in the TCAP message.

The second method is an operation code format and size identifying method which identifies a protocol type of message originating network on the basis of a code format and size of the TCAP message.

The third method is an MAP start data identifying method which identifies a protocol type of message originating network based on a parameter tag, a MAP start tag value contained in a component portion of the TCAP message.

The protocol distributing unit 52 searches a previously constructed MAP information database 52a based on the identification information of the protocol identifying unit 51 and distributes a MAP message to a pertinent MAP. For this purpose, the protocol distributing unit 52 includes information in MAP information database 52a such as specific identifiers for each MAP application, an IPC communication identifier (a queue or a shared memory) for an inter-process communication (IPC) inside a system, a MAP protocol identifier (identifying the ANSI and the GSM), a processing-available operation code, and/or an application context name. The protocol distributing unit also includes a message distributing unit 52b for searching the MAP information database 52a, selecting a corresponding MAP, and distributing the MAP message.

In its initialization, the MAP information database 52a is constructed by collecting information on the MAP of a corresponding system, and in this case, the corresponding MAP information is searched to be collected from a file or a database in the initial stage of execution of the protocol distributing unit 52 or collected by receiving when the MAP is initialized.

Figure 6:
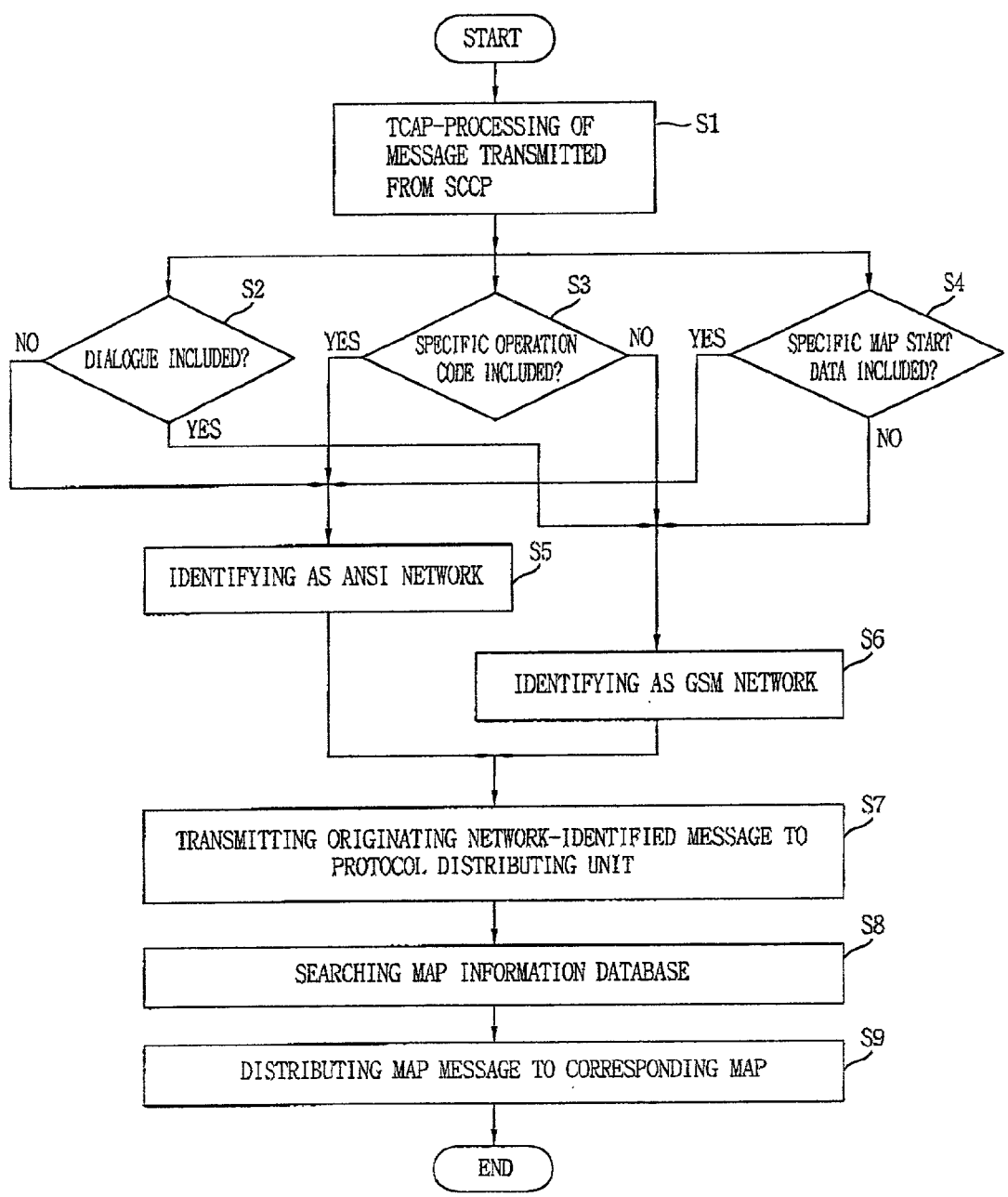
FIG. 6 is a flow chart illustrating a MAP message processing method for a different type network interworking in accordance with a preferred embodiment of the present invention.

The MAP message processing method for interworking between heterogeneous networks, as described above will now be described with reference to FIG. 6.

First, referring to the network element of a mobile communication network, generally, a corresponding network element is implemented to provide network service according to one standard specification, like IS-41, GSM 09.02, 3GPP 29.002, and a corresponding MAP can be realized as one or plural processes or a part of a different process in a UNIX system.

When a received No.7 message is transmitted to the SCCP through the MTP (MTP1, MTP2, MTP3) or the TCP/UDP/IP and M3UA, the corresponding SCCP identifies the data by sub-systems and transmits them to the TCAP. Then, the TSL 41 of the TCAP processes a transaction portion of the transmitted TCAP message and transmits it to the CSL 42, and the CSL 42 processes the received TCAP message through the DHA or the CHA (step S1) and transmits it to the protocol identifying unit 51.

Upon receipt of the TCAP message, which has been DHA 42a and CHA 42b function processed by the CSL 42, the protocol identifying unit 51 analyzes the transmitted TCAP message to identify from which network (e.g., the ANSI network or the GSM network) the corresponding TCAP message has been received. This may be achieved by determining, for example, whether the transmitted TCAP message contains a dialogue portion, an operation code or a MAP message tag such as a MAP start data (steps S2-S6).

The corresponding protocol identifying unit 51 can identify a protocol type of message originating network according to whether the TCAP message includes a dialogue portion or not (step S2). The reason is because, unlike the transaction portion or the component portion, the dialogue portion of the TCAP message is necessarily used in the GSM network while it is not used in the ANSI network. (This is evident from Table 1 previously discussed.) Accordingly, if the dialogue portion is included in the corresponding TCAP message, the protocol type of message originating network is recognized as a GSM-MAP (step S6), while if the dialogue portion is not included in the TCAP message, the protocol type of message originating network is recognized as ANSI-MAP (step S5).

The protocol identifying unit 51 can also identify a protocol type of message originating network based on an operation code format of the TCAP message (step S3) The operation code of the TCAP message can be constructed by more than 1 byte, may contain operation family information, and constructs the operation code by more than 2 bytes in the ANSI network.

In case of the ANSI network, the first 1 byte defines a specific hexa value '0x09' as an operation family. Thus, if the operation code of the TCAP message contains specific operation family information of the hexa value '0x09', the protocol type of message originating network is recognized as the ANSI-MAP (step S5). Meanwhile, if the TCAP message includes different operation family information or does not include any operation family information, the protocol type of message originating network is recognized as the GSM-MAP (step S6). Table 1 also makes this discrepancy evident.

The protocol identifying unit 51 can also identify an originating network based on a MAP message tag such as a MAP start data contained in the component portion of the TCAP message (step S4).

In the ANSI network, a MAP start data, that is, a parameter tag such as the MAP start byte value, is defined as a hexa value '0x31'. Accordingly, if the parameter tag, the MAP start data of the TCAP message, has a start byte of the hexa value '0x31', the protocol type of message originating network is recognized as the ANSI (step S5). And, if it is not the hexa value '0x31', the protocol type of message originating network is recognized as the GSM network (step S6). Those skilled in the art can appreciate that more than one of the foregoing methods may be used to identify the originating network. In fact, the redundancy provided by performing two or more identification methods may advantageously serve as a confirmation of the identified network.

After the protocol identifying unit 51 identifies the protocol type of message originating network in the above-described manner, it transmits the message to the protocol distributing unit 52 in order to transmit the message to the MAP (step S7). The protocol distributing unit 52 searches the MAP information database 52a which has been previously constructed based on the identification information (the originating network protocol identifier, the operation code and the MAP start data) of the protocol identifying unit 51 (step S8), selects the MAP, and distributes the MAP message to the MAP layer (step S9).

More specifically, the TCAP protocol processing unit, including the TSL, DHA 42a, CHA 42b, and the protocol identifying unit 51, extracts an identifier (the ANSI network or the GSM network) for identifying the protocol type of message originating network and the operation code, and the like, from the received message while processing the received TCAP message, and transmits them to the protocol distributing unit 52.

The protocol distributing unit 52 searches the previously constructed MAP information database 52a based on the originating network protocol identifier and the operation code, determines to which MAP the message is to be transmitted, and transmits the message to the pertinent MAP through the message distributing unit 52b.

As so far described, the MAP processing system and method for interworking between heterogeneous networks according to the present invention has the many advantages.

For example, the MAP message identifying and distributing functions, which are core functions for interworking between different type mobile communication networks using different standards specifications, are provided so that heterogeneous network interworking can be performed, and this is expected to have significant application in the next generation mobile communication network environment.

In addition, the global roaming service, which is a fundamental target of next-generation mobile communication networks, can be provided to a mobile subscriber of a different type mobile communication network and the MAP processing system and method according to the present invention can be adopted for interworking between a personal communication service (PCS) network and an IMT-2000 network in the future.

More specifically, by identifying and distributing a MAP message in a network element so that different type mobile communication networks can interwork with each other, location management, mobile call processing, and various supplementary services associated, for example, with cal processing can be provided. furthermore, global roaming service can be provided to different types of mobile communication network subscribers.

Further, the system and method of the present invention is particularly well suited to providing interworking between an ANSI-MAP-based MC-41 network and a GSM-MAP-based DS-MAP network in an international mobile telecommunication-2000 (IMT-2000) environment.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications and variations will be apparent to those skilled in the art. For example, while the present invention has been described as providing an internetworking capability between an ANSI network and a GSM network, those skilled in the art can appreciate that the system and method of the present invention may also be applied to provide internetworking between one of these networks and a different network, or between two networks that do not adhere to either an ANSI or GSM standard. In the claims, means-plus-function clauses are intended to cover the structure described herein as performing the recited function and not only structural equivalents but also equivalent structures.

What is claimed is:

1. A Mobile Application Part (MAP) message processing system for interworking between heterogeneous networks, wherein
   a protocol identifying unit which analyzes a Transaction Capabilities Application Part (TCAP) message to identify a protocol type of a message originating network which transmitted a MAP message associated with the TCAP message; and
   a protocol distributing unit which distributes the MAP message to a corresponding MAP layer based on the protocol type identified by the protocol identifying unit, wherein the protocol identifying unit performs redundant identification methods to identify the protocol type of the message originating network.

2. The system of claim 1, wherein each of the identification methods independently confirms the protocol type of the message originating network.

3. The system of claim 2, wherein the redundant identification methods include:
   determining whether the TCAP message includes or omits a dialogue portion; and
   determining whether the TCAP message includes or omits a predetermined type of operation family information, wherein the inclusion or omission of the dialogue field and predetermined type of operation family information indicates whether the message originating network is an ANSI network or a GSM network.

4. The system of claim 3, wherein the redundant identification methods further include: determining whether the TCAP message includes a predetermined type of parameter tag of MAP start data.

5. The system of claim 3, wherein determining whether the TCAP message includes or omits a predetermined type of operation family information includes determining whether the TCAP message includes operation family information that corresponds to a predetermined hexa-decimal value.

6. A Mobile Application Part (MAP) message processing system for interworking between heterogeneous networks, including:
a protocol identifying unit which analyzes a Transaction Capabilities Application Part (TCAP) message to identify a protocol type of an originating network which transmitted a MAP message associated with the TCAP message; and
a protocol distributing unit which distributes the MAP message to a corresponding MAP layer according to the protocol type identified by the protocol identifying unit, wherein the protocol identifying unit includes a dialogue portion determining unit which identifies whether the TCAP message includes a dialogue portion corresponding to a GSM-type network, wherein the protocol identifying unit further comprises at least one of:
an operation code determining circuit which identifies an operation code of the TCAP message; or
a MAP start tag value determining circuit which identifies a parameter tag of a MAP start data.

7. The system of claim 6, wherein the protocol distributing unit comprises:
a MAP protocol information database which includes MAP information associated with the protocol type identified by the protocol identifying unit; and
a message distributing unit which searches the MAP protocol information database based on the identified protocol type to determine a MAP then distributes said MAP message to said corresponding MAP layer.

8. The system of claim 7, wherein the MAP information in the MAP protocol information database includes at least one of a MAP application process identifier, an identifier for an inter process communication (IPC), a MAP protocol identifier, a process-available operation code, and an application context name.

9. The system of claim 7, wherein the MAP protocol information is collected by searching a file or a database at an initial stage of execution of the protocol distributing circuit, or is constructed by collecting information transmitted from the MAP protocol when the MAP protocol is executed.

10. The system of claim 6, wherein the protocol identifying unit includes the operation code determining circuit and the MAP start tag value determining circuit.

11. A Mobile Application Part (MAP) message processing system for interworking between heterogeneous networks, comprising:
a protocol identifying unit which determines a protocol type of a message originating network by identifying a dialogue portion, an operation code, and a MAP start tag value of a message transmitted from lower layer to Transaction Capabilities Application Part (TCAP);

a MAP protocol information database which includes information on a MAP of the system; and
a message distributing unit which searches the MAP protocol information database based on the protocol type identified by the protocol identifying unit to determine a MAP and then distributes a message to a corresponding MAP layer.

12. The system of claim 11, wherein said heterogeneous networks include a GSM-MAP based mobile communication network and an ANSI-MAP based mobile communication network, and wherein the dialogue portion is mandatory in the GSM-MAP based mobile communication network, while it is not used for the ANSI-MAP based mobile communication network.

13. The system of claim 11, wherein said heterogeneous networks include a GSM-MAP based mobile communication network and an ANSI-MAP based mobile communication network, and wherein the operation code includes operation family information separately defined for the ANSI-MAP based mobile communication network and the GSM-MAP based mobile communication network.

14. The system of claim 11, wherein said heterogeneous networks include a GSM-MAP based mobile communication network and an ANSI-MAP based mobile communication network, and wherein the MAP start tag value includes specific tag value information separately defined for the ANSI-MAP based mobile communication network and the GSM-MAP based mobile communication network.

15. A Mobile Application Part (MAP) message processing method for interworking between heterogeneous networks which use different MAP standards, comprising:
analyzing a Transaction Capabilities Application Part (TCAP) message to identify a protocol type of a message originating network which transmitted a MAP message associated with the TCAP message; and
distributing the MAP message to a corresponding MAP layer based on the protocol type identified in said analyzing step, wherein said heterogeneous networks include an ANSI-MAP based network and a GSM-MAP based network, wherein analyzing the TCAP message includes performing redundant identification methods to identify the protocol type of the message originating network.

16. The method of claim 15, wherein each of the identification methods independently confirms the protocol type of the message originating network.

17. The method of claim 16, wherein the redundant identification methods include:
determining whether the TCAP message includes or omits a dialogue field; and
determining whether the TCAP message includes or omits a predetermined type of operation family information, wherein the inclusion or omission of the dialogue field and predetermined type of operation family information indicates whether the message originating network is an ANSI network or a GSM network.

18. The method of claim 17, wherein the redundant identification methods further include: determining whether the TCAP message includes a predetermined type of parameter tag of MAP start data.

19. The method of claim 17, wherein determining whether the TCAP message includes or omits a predetermined type of operation family information includes determining whether the TCAP message includes operation family information that corresponds to a predetermined hexa-decimal value.

20. A Mobile Application Part (MAP) message processing method for interworking between heterogeneous networks, comprising:

transmitting a message received from a remote node from a lower layer to TCAP;

processing the received message according to its message type;

identifying a protocol type of a message originating network which transmitted the message based on whether the message includes a dialogue portion corresponding to a GSM-type network;

determining MAP protocol information based on the protocol type identified in said identifying step; and distributing the message to a corresponding MAP layer, wherein the protocol type of the message originating network is identified according to an operation code contained in the message.

wherein if the operation code of the message contains a first type of operation family information defined in the ANSI-MAP standard specification, the protocol type of message originating network is identified as an ANSI-MAP based network, and wherein if the operation code of the message contains a second type of operation family information or if the operation code of the message does not contain operation family information, the protocol type of message originating network is identified as a GSM-MAP based network.

21. The method of claim 20, wherein if the dialogue portion is included in the message, the protocol type of the message originating network is identified as a GSM-MAP based network, and wherein if the dialogue portion is not included in the message, the protocol type of message originating network is identified as an ANSI-MAP based network.

22. The method of claim 20, wherein the protocol type of the message originating network is identified by a MAP start tag value contained in a component portion of the message.

23. The method of claim 22, wherein if the MAP start tag value contains a first type of MAP start tag value, the protocol type of message originating network is identified as an ANSI-MAP based network, and wherein if the MAP start tag value contains a second type of MAP start tag value, the protocol type of the message originating network is identified as a GSM-MAP based network.

24. The method of claim 20, further comprising:

constructing a MAP protocol information database by searching information from a file or a database at an initial stage of executing of a protocol distribution function, or by receiving information on a MAP of a system when the MAP is executed.

25. A Mobile Application Part (MAP) message processing method for interworking between heterogeneous networks, comprising:

transmitting a message received from a remote node from a lower layer to Transaction Capabilities Application Part (TCAP);

processing the message received by the TCAP according to its message type;

analyzing a dialogue portion, an operation code, and a MAP start tag value of the processed message to identify a protocol type of a message originating network; and searching MAP protocol information based on the protocol type identified for the originating network and distributing the message to a pertinent MAP layer.

26. The method of claim 25, wherein if the dialogue portion is included in the message, the protocol type of message originating network is identified as a GSM-MAP based network, and wherein if the dialogue portion is not included in the message, the protocol type of message originating network is identified as an ANSI-MAP based network.

27. The method of claim 25, wherein if the operation code of the message contains a first type of operation family information, the protocol type of message originating network is identified as an ANSI-MAP based network, and wherein if the operation code of the message contains a second type of operation family information or if the operation code of the message does not contain operation family information, the protocol type of message originating network is identified as a GSM-MAP based network.

28. The method of claim 25, wherein if the MAP start tag value contains a first type of MAP start tag value, the protocol type of message originating network is identified as a ANSI-MAP based network, and wherein if the MAP start tag value contains a second type of MAP start tag value, the protocol type of message originating network is identified as a GSM-MAP based network.

29. A method for managing the transfer of information between networks which operate using different mobile application part (MAP) standards, comprising:

receiving a Transaction Capabilities Application Part (TCAP) message from a first network which operates according to a first MAP standard;

analyzing information in the message to identify a protocol of the first network; and determining a MAP layer associated with a second network which operates according to a second MAP standard, the MAP layer being determined based on the protocol identified by said analyzing, said analyzing including:

determining whether the TCAP message contains or omits at least one of predetermined dialogue information or operation code information including predetermined operation family information; and identifying the protocol of the first network based on the whether the TCAP message contains or omits at least one of said predetermined dialogue information and said operation code, wherein said analyzing includes determining whether the TCAP message contains at least two of said predetermined dialogue information, said operation code, or a predetermined parameter tag.

30. The method of claim 29, wherein said identifying includes:

searching a database of information which associates information indicative of the protocol of the first network with said predetermined dialogue information or said operation code information including said predetermined operation family information; and identifying the protocol of the first network as one which corresponds to the protocol information associated with said predetermined information in the database.

31. The method of claim 29, wherein said first network and said second network are selected from the group consisting of an ANSI-based mobile communications network and a GSM-based mobile communications network.

32. The method of claim 29, wherein said analyzing includes determining whether the TCAP message contains all three of said predetermined dialogue information, said operation code, and said predetermined parameter tag.

33. A system for managing the transfer of information between networks which operate using different mobile application part (MAP) standards, comprising:

an analyzing unit which analyzes a Transaction Capabilities Application Part (TCAP) message from a first network, which operates according to a first MAP standard, to identify a protocol of the first network; and a distribution unit which determines a MAP layer associated with a second network which operates according to a second MAP standard, said distribution unit determining the MAP layer based on the protocol identified by the analyzing unit, wherein said analyzing unit determines whether the TCAP message contains or omits at least one of predetermined dialogue information or operation code information including predetermined operation family information, and then identifies the protocol of the first network based on the whether the TCAP message contains or omits said predetermined dialogue information or said operation code, wherein the analyzing unit determines whether the TCAP message contains at least two of said predetermined dialogue information said operation code, or a predetermined parameter tag.

34. The system of claim 33, wherein said analyzing unit searches a database of information which associates information indicative of the protocol of the first network with said predetermined information, and then identifies the protocol of the first network as one which corresponds to the protocol information associated with said predetermined information in the database.

35. The system of claim 33, wherein said first network and said second network are selected from the group consisting of an ANSI-based mobile communications network and a GSM-based mobile communications network.

36. The system of claim 33, wherein the analyzing unit determines whether the TCAP message contains all three of said predetermined dialogue information, said operation code, and said predetermined parameter tag.

* * * * *